Figure 1:
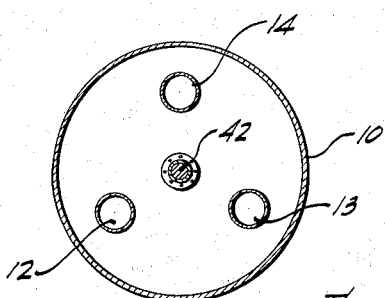

June 5, 1956  C. H. O. BERG ET AL  2,748,497
HANDLING OF GRANULAR SOLIDS
Filed Sept. 20, 1952  2 Sheets-Sheet 1

INVENTORS.
CLYDE H. O. BERG,
CHARLES J. WELSH,
BY
AGENT.

June 5, 1956

C. H. O. BERG ET AL 2,748,497

HANDLING OF GRANULAR SOLIDS

Filed Sept. 20, 1952

2 Sheets-Sheet 2

INVENTORS.
CLYDE H. O. BERG,
CHARLES J. WELSH,
BY
AGENT.

United States Patent Office 2,748,497
Patented June 5, 1956

2,748,497
HANDLING OF GRANULAR SOLIDS

Clyde H. O. Berg, Long Beach, and Charles J. Welsh, Orange, Calif., assignors to Union Oil Company of California, Los Angeles, Calif., a corporation of California Application September 20, 1952, Serial No. 310,694

11 Claims. (Cl. 34—168)

This invention relates to the handling of powdered or granular solids and in particular to an improved method and apparatus for maintaining a constant flow rate and a uniform rate of solids removal throughout the cross-sectional area of a treating or contacting column or other apparatus through which granular solids are passed.

The movement and recirculation of granular or powdered solid materials is of great importance in a considerable number of industrial operations. Foremost among these are those processes in which granular solids such as adsorbents or catalysts are passed through a treating column in which a fluid, gaseous or liquid, is also passed to contact the solid material. In these operations particularly, a constant flow rate of granular solids is essential to adequate control of the operation. Equally essentially is the control of the rate of solids flow through any given part of the cross-sectional area of the column. It is most desirable that a uniform flow of granular solids be maintained throughout the entire cross-sectional area. Failure to maintain such uniform flow has very adverse effects on such contacting processes as contact coking, catalytic cracking and other hydrocarbon conversion processes involving granular solids such as a catalyst, the other well-known catalytic processes such as Fischer-Tropsch synthesis, and any other fluid-solids contact processes. Continuous ion exchange operations involving contact of liquids with the solid ion exchange resins and like materials are benefited by this invention.

The attempt to withdraw granular solids from such contacting vessels by means of a conical draw-off section connecting the bottom of a large diameter column with a relatively small diameter outlet generates solids flow effects which may be reflected completely through the height of the contacting column as a non-uniform flow pattern. For example, the center portion of the solids bed may flow downwardly from 10 to as much as 500 per cent faster than the material adjacent the walls of the column. In operations where solids flow control is critical, as in those operations mentioned above, this results in non-uniform utilization of the catalyst or adsorbent, insufficient contacting of the fluid passed in contact with the solid material, and in many cases prevents the process from being continued over desirably long lengths of time.

The present invention is therefore directed to an improved process and apparatus which will permit the establishment and maintenance of uniform granular solids flow throughout the cross-sectional area of such contacting columns. Such a method and apparatus for solids control is well adapted to the various well-known fluid-solids contacting processes in which uniform solids flow is to be maintained.

It is therefore a primary object of this invention to provide a process and apparatus for achieving the above-named results.

It is another object of this invention to provide an improved granular solids feeding device for metering a controllable volumetric flow of granular solids and which, while capable of maintaining uniform rates of solids flow, is substantially unaffected by the passage of fluids in either direction through the feeding device.

A more specific object of this invention is to provide a granular solids feeding device having substantially the same cross-sectional area as the column in which it is employed and which is characterized by providing substantially constant throughput of granular solids through each incremental portion of cross-sectional area of the column.

A more specific object of this invention is to provide such a solids feeding device which exerts substantially no resistance to the flow of fluids through the feeding device in either direction.

Other objects and advantages of the present invention will become apparent to those skilled in the art as the description thereof proceeds.

Briefly, the present invention comprises a granular solids feeding device consisting essentially of a plurality of stationary feeder tubes through which the solids to be metered are flowing, a rotatable tray provided with dependent charge tubes disposed below and alignable with the feeder tubes, and a stationary lower tray provided either with dependent tubes or discharge openings. Although "tubes" are specified in the following description, it should be understood that we intend to include conduits of other than circular cross section. In one modification, the feeder tubes are dependent from an upper stationary tray. The trays of the device are disposed in a horizontal plane and are substantially the same diameter as the diameter of the column or conduit or vessel through which the granular solids are flowing and in which a uniform downward solids velocity and constant solids flow rate are desired. The volumetric rate of solids throughput in the feeding device is determined positively and the solids are metered therethrough at a rate which is dependent upon the volume of the charge tubes depending from the movable tray and the rate of rotation of the rotatable tray.

The upper tray is a flat plate maintained in a horizontal plane and supported peripherally at the walls of the vessel in which the solids handling device is to be used. It is further provided with a plurality of dependent feeder tubes which are open at both ends, open through and depend from said tray, and are arranged in a regular geometric pattern thereon. The regular geometric pattern consists of one or more circular rows of dependent feeder tubes, the circle being centered at the vertical axis of the device and usually the vertical axis of the column or vessel through which the solids flow. The distance between centers of adjacent feeder tubes in a given circular row is adjusted to be greater than a distance equal to 4 times the tube inside diameter (or the inside dimension of the conduit along the circular row) plus 7 times the clearance or distance between the lower opening of the feeder tubes and the upper surface of the rotatable tray disposed immediately below. The reason for this particular minimum spacing is to prevent leakage of solids through the device and maintain a positive control over solids throughput. This minimum spacing fixes the number of feeder tubes permissible in a circular row of a given diameter or the minimum diameter for a given number of feeder tubes.

The center or rotatable tray contains a plurality of dependent charge tubes which open through and depend from the rotatable tray and are arranged thereon in one or more circular rows about the vertical axis of the tray. These charge tubes may be disposed close to one another without causing solids leakage and there is no minimum spacing. The diameter of the rotatable tray is somewhat less than the diameter of the upper or lower stationary trays leaving an annular opening for the flow of fluids between the periphery of the rotatable tray and the inner walls of the container or column in which the device is positioned. This tray is supported on any sort of a track or other suitable support adapted to permit the rotation of the rotatable tray in a horizontal plane about a vertical axis passing through the center of the tray. For example, a circular track may be provided on the lower surface of the rotatable tray between any pair of adjacent circular rows of tubes and supported through 3 or more wheeled supports which in turn are supported by the lower tray or the walls of the column. Conversely, such wheels may be attached to the rotatable tray and ride on a track supported by the lower tray or the column walls. Means are provided for imparting a rotary motion to the rotatable tray such as, for example, a ring gear with pinion gear drive, the pinion shaft being connected to a prime mover. An electric or other type motor having a variable speed transmission is preferably employed as the prime mover. Thus the angular velocity of the rotatable tray is variable permitting a variation in the solids flow rate through the device.

Positioned immediately below the lower openings of the charge tubes is the lower stationary tray which may or may not be provided with dependent tubes. This tray is provided with a plurality of discharge openings in the same geometric pattern formed by the upper openings of the feeder tubes on the upper stationary tray. This pattern, however, is misaligned in that the discharge openings of the lower tray are displaced along the tube circles a center-to-center distance equal to or greater than twice the inside diameter of the discharge openings in the particular tube circle plus 3.5 times the clearance between the lower opening of either the feeder tube or charge tube and upper surface of either the rotatable tray or the lower stationary tray, respectively. Ordinarily the inside diameters of the charge and feeder tubes are equal to the diameter of the discharge openings. This displacement is the minimum necessary to prevent solids leakage through the device. This lower stationary tray may be provided with punched or bored openings through which the solids discharge from the charge tubes of the rotatable tray or it may have dependent tubes similar to those of the upper stationary tray. The distance between the centers of these openings in a given row is the same as the spacing of the feeder tubes in the corresponding row.

Thus, during operation of the device of this invention, the rotation of the rotatable or movable tray successively brings a given charge tube first into alignment with a feeder tube from which it is filled with granular solids. The solids are prevented from discharging from the charge tubes due to the fact that when a given charge tube is aligned with a feeder tube in a given tube circle it is misaligned with a corresponding discharge opening of the lower stationary tray in the same circle as described above. The lower opening of the charge tube therefore is sealed against an unperforated area of the lower stationary tray. Continued rotation of the rotatable tray takes the charge tube out of alignment with the feeder tube and brings it into alignment with a discharge opening in the lower stationary tray. With the lower opening of the charge tube aligned with this discharge opening the solids flow by gravity therethrough and the charge tube moves on for subsequent alignment with the next feeder tube in the particular tube circle.

It is thus apparent that on the upper stationary tray one or more circular rows of spaced feeder tubes are arranged. On the rotatable tray one or more circular rows of charge tubes are provided, each of these rows having a diameter equal to the diameter of a corresponding circular row of feeder tubes depending from the upper stationary tray. Similarly, the discharge openings in the lower stationary tray are arranged in corresponding circular rows having diameters equal to those of the circular rows of the upper and rotatable trays.

If desired, the feeder tubes depending from the upper stationary tray may be made to converge thereby providing geometrical arrangement of concentric circles of the lower openings of the feeder tubes which are geometrically similar to the pattern of the upper openings but reduced in scale. In this modification, the diameter of each circular row of tubes on the rotatable tray is different from the diameter of the corresponding circular row of feeder tubes but is the same as the diameter of the corresponding circular row of discharge openings in the lower stationary tray. Such a modification permits an increased annular opening for fluid flow through the feeding device around the rotatable tray.

As will be apparent, the solids flow rate of the solids handling device of this invention is positively determined by the number of dependent charge tubes on the rotatable tray, the diameter and length of these charge tubes, the number of times which each tube fills and empties per revolution of the rotatable tray, and the angular velocity of the rotatable tray.

Since a greater number of feeder tubes can be employed in the outer circular rows, it is obvious that the charge tubes in these rows will fill and empty a greater number of times per revolution than will those in the inner rows. It is also apparent that the innermost row of charge and feeder tubes will drain a circular area at the center of the column or vessel in which the device is employed and that any further circular rows of tubes will drain annular-shaped areas surrounding the central circular area. In order to maintain a uniform downward velocity of granular solids in the column, the diameter of each circular row of tubes is adjusted in accordance with the number of times that the tubes in the row fill and empty per revolution, so that on a time basis a constant volumetric flow of granular solids per unit column area in the circular and annular-shaped areas referred to is maintained. For example, in a solids feeding device in which 3 circular rows of feeder and charge tubes are employed, the inner row contains 3 feeder tubes and 8 charge tubes, the next row contains 6 feeder tubes and 16 charge tubes and the outer row contains 12 feeder tubes and 32 charge tubes. Per revolution of the rotatable tray, the inner charge tube row discharges 8 times 3 or 24 charge tube volumes of solids, the next row discharges 16 times 6 or 96 charge tube volumes of solids, and the outer row discharges 32 times 12 or 384 charge tube volumes of solids. These volumes are in the ratio of 1 to 4 to 16. Consequently, the cross-sectional areas drained by each of the circular rows must be in the same ratio. A uniform downward solids velocity is obtained in a column 11 feet 9.5 inches in diameter and having a cross-sectional area of 109 square feet by disposing the inner row of tubes so that it drains the central circular area of 5.2 square feet, the next row drains an annular-shaped area of 20.8 square feet, and the outer circular row of tubes drains an area of 83.2 square feet.

In order to prevent interference with the filling and emptying of the charge tubes with the solids due to the simultaneous passage of fluids through the device, a plurality of tubular risers surmounted with bubble caps is provided on the upper surface of the upper stationary tray. The solids surround these bubble caps and risers and a solids-free passageway for fluids in either direction is provided thereby through the upper stationary tray. The center or movable tray is provided with an annular clearance at its periphery which is open to the flow of fluids without substantial resistance. The perforations constituting the discharge openings in the lower stationary tray usually provide adequate area for unrestricted fluid flow through the lower stationary tray, but if additional open area is desirable, an intermediate row of fluid flow openings and risers if desired may be provided therein between adjacent circular rows of discharge openings so that no solids flow therethrough from any of the charge tubes. Granular solids never pass through these openings since they lie in a circle between the circular rows of discharge openings. Such an arrangement of fluid passageways allows the simultaneous flow of fluids upwardly or downwardly through the device paralleling the paths taken by granular solids flowing downwardly therethrough. Thus the rate of flow of solids is neither enhanced nor impeded by the simultaneous fluid flow.

The inside diameter of the charge tubes and feeder tubes is dependent to some extent upon the particle size of the granular solids being transferred. When the inside diameter of these tubes approaches about 7 times the maximum particle diameter, interference with the solids flow rate begins to occur. Consequently, the minimum inside diameter of the feeder and charge tubes is about 7 times and preferably greater than 10 times the maximum particle diameter of the granular solids being handled.

The clearance maintained between the lower extremities of the feeder and charge tubes and the upper surfaces of the rotatable and lower stationary trays respectively is of importance to minimize the attrition of granular solids between these points. This clearance must be at least 3 times the maximum particle diameter of the granular solids being handled. If these clearance and tube diameter limitations are observed, the motions of the solids and the rotatable tray are smooth and the attrition of granular solids in the device of this invention is reduced to a minimum. Obviously such considerations are extremely important in the well-known adsorption and catalytic processes in which adsorbents or catalysts costing up to $10 or $15 per pound are recirculated.

It should be noted that the granular solids feeding device of this invention is applicable to the transfer of granular solids in processes in which such solids are contacted with either gaseous or liquid fluids such as, for example, catalytic cracking, reforming, desulfurization of petroleum fractions, separation of gaseous mixtures on a solid granular adsorbent, contacting of liquids with granular solid ion exchange resins, the adsorptive treating of lubricating oil fractions, and other processes. The device may also be employed in its smaller modifications as a feeding or solids metering device for introducing a positively controlled rate of granular solid reagents in chemical processes and the like.

Figure 2:
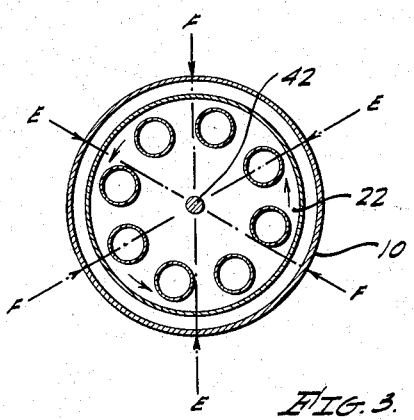
Figure 3:
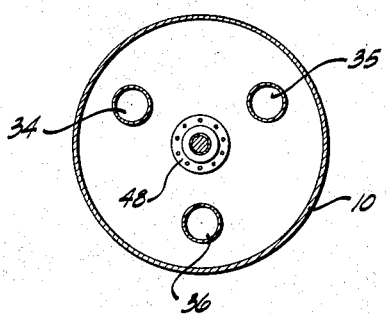
Figure 4:
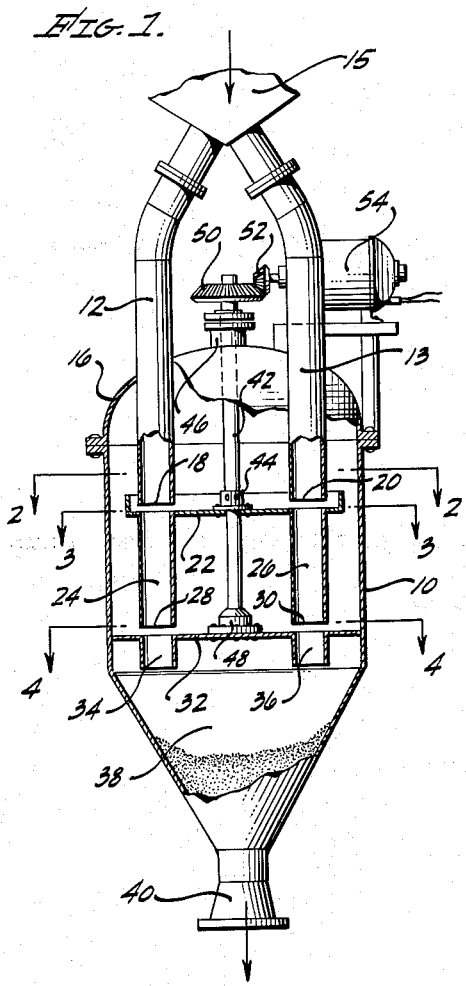
Figure 6:
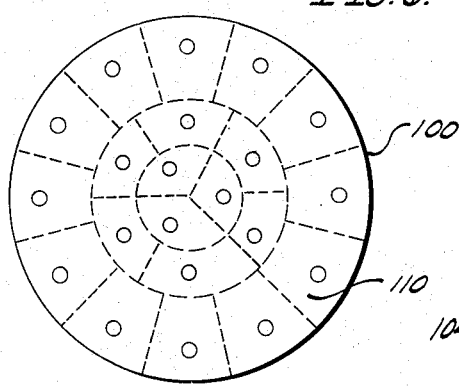
Figure 7:
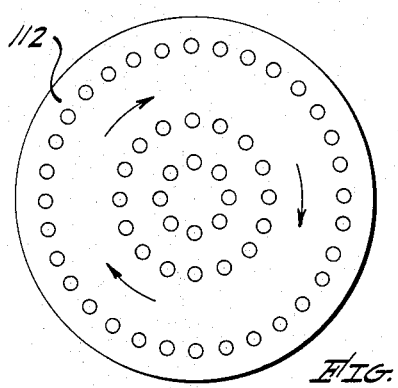
Figure 8:
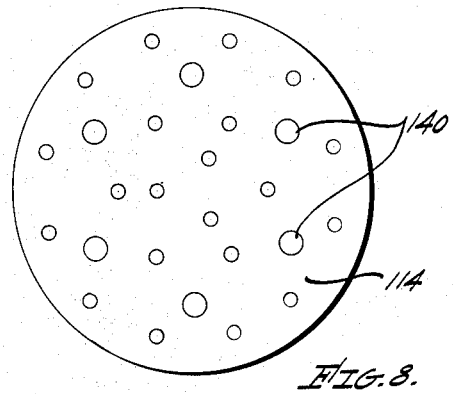
Figure 5:
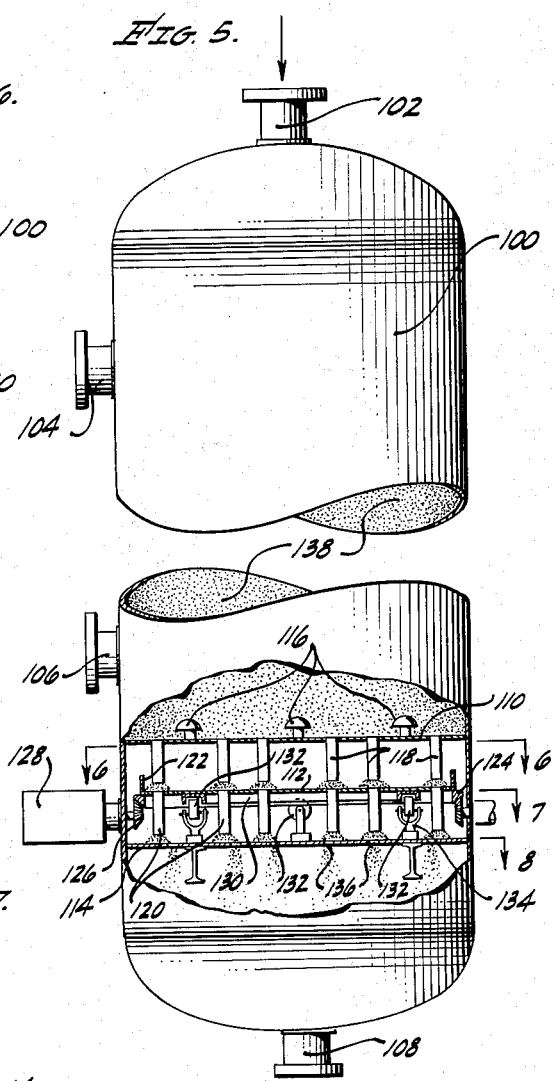

The process and apparatus of this invention will be more clearly understood by reference to the accompanying drawings in which:

Figure 1 is an elevation view in partial cross section of a physically smaller modification of the device of this invention, Figures 2, 3, and 4 are transverse cross sections showing the geometrical arrangement of the charge and feeder tubes and the discharge openings and their angular relationship to each other, Figure 5 is an elevation view in partial cross section of a contacting column of any type through which granular solids are uniformly passed at a uniform rate, and Figures 6, 7, and 8 are transverse views showing the geometrical arrangement of the tube and discharge openings and their angular relation in the device of Figure 5.

Referring now more particularly to Figure 1, a modification is shown in which only a rotatable and a lower stationary tray are provided and in which the feeder tubes do not depend from an upper stationary tray but merely discharge from a source of solids permitting the device to be employed solely for the volumetric metering of solids.

Only two of the three feeder tubes and only two of the eight charge tubes are shown in Figure 1 to facilitate illustration and description. Also in Figure 1 discharge openings 34 and 36 are indicated as being aligned with charge tubes 24 and 26 respectively while these latter tubes are aligned with feeder tubes 12 and 13. This is also done to facilitate illustration and actually the charge tubes are never simultaneously aligned with the corresponding feeder tubes and discharge openings.

The device of Figure 1 consists of feeder vessel 10 having feeder tubes 12, 13, and 14 (shown in Figure 2) opening from an elevated source of solids 15. These tubes extend downwardly through the dished head 16 of vessel 10 and have outlet openings 18 and 20 disposed in a horizontal plane. Rotatable tray 22 is disposed immediately below lower openings 18 and 20 and is provided with dependent charge tubes 24 and 26 which in turn have lower openings 28 and 30 respectively disposed in a horizontal plane immediately adjacent lower stationary tray 32. Tray 32 is in turn provided with discharge openings 34 and 36 through which the granular solids discharge from charge tubes 24 and 26 into lower zone 38 of vessel 10. Outlet opening 40 is provided for the metered flow of granular solids.

The rotation of movable tray 22 is obtained by the rotation of central drive shaft 42 attached to movable tray 22 by a collar or other means 44. A fluid tight packing gland 46 disposed at the top of dished head 16 serves as an upper bearing and seal for shaft 42. A thrust bearing 48 at the lower end of shaft 42 mounted on stationary tray 32 is also provided. The support for rotatable tray 22 is derived from thrust bearing 48 and, if desired, suitable means for resisting thrust forces may be incorporated in upper bearing 46. Bevel gear 50 is provided at the top of shaft 42 which is rotated by pinion 52 driven by a variable speed prime mover 54. Preferably, the prime mover contains a variable speed transmission adapted to permit variation in the rotary speeds of pinion 52 thus allowing a variation in the solids flow rate.

Referring now more particularly to Figures 2, 3, and 4, transverse sections of the device of Figure 1 are shown illustrating one modification of the geometrical arrangement of feeder and charge tubes and discharge openings and the angular displacement of the latter with respect to the axes of the feeder tubes. In Figure 2 a cross section of the upper part of vessel 10 is shown in which a circular row of 3 feeder tubes 12, 13 and 14 are shown. Central shaft 42 is also shown. The feeder tubes are spaced 120° apart in the circular row.

In Figure 3 a transverse view showing the arrangement of the charge tubes on the rotatable tray 22 is shown. A circular row of 8 charge tubes spaced 45° apart is shown and the diameter of the tube circle is the same as the diameter of the tube circle in Figure 2. Peripheral positions noted "F" and "E" indicate the positions at which each charge tube fills and empties respectively.

In Figure 4 is a transverse section showing the arrangement of the discharge openings 34, 35, and 36. Lower bearing 48 is also shown. The diameter of the tube circle is the same as in Figures 2 and 3. It will be noted that the discharge openings are spaced 120° apart but are angularly displaced 60° along the circular row from the positions of the feeder tubes indicated in Figure 2. Thus a given charge tube is filled with solids beneath feeder tube 14 and discharges its solids through discharge opening 35 after the charge tube has moved 60° clockwise from the position beneath feeder tube 14. Rotation may be in either direction. In this device, each of the 8 charge tubes fills and empties 3 times per revolution and thus the volumetric flow per revolution is equal to 24 charge tube volumes of solids.

Referring now to Figure 5, contacting column 100 is provided with an upper inlet 102 for granular solids to be contacted and is further provided with inlet and outlet 104 and 106 for the fluids into and out of the column. Obviously, either concurrent or countercurrent flow of the fluids through column 100 may be obtained. An outlet 108 for removal of the granual solids from below the metering device is also provided.

The solids metering device of this invention is disposed adjacent the lower part of column 100 and consists of upper stationary tray 110, intermediate rotatable tray 112, and lower stationary tray 114. The upper tray is provided with bubble caps 116 referred to above and with 3 circular rows, each containing a plurality of feeder tubes 118. The rotatable tray 112 is provided with 3 circular rows of dependent charge tubes 120. The rotatable tray is also provided with vertical flange 122 which serves to prevent overflow of solids at the periphery of tray 112 from the outermost row of feeder tubes 118. The rotatable tray is also provided with ring gear 124 which is driven by 1 or more pinions 126 which in turn are rotated by a prime mover, preferably a variable speed reduction system indicated generally at 128. Other rotary drive mechanisms may be substituted.

Rotatable tray 112 is supported and guided in its horizontal plane of rotation with support wheel guide track 130 which in this modification is disposed in a circular path between the middle and outermost rows of charge tubes. Supported from lower stationary tray 114 are at least 3 support guide wheels 132 on which rests support wheel guide track 130. A suitable support member such as clevis 134 in turn supports each guide wheel. In large diameter units, preferably more than 3 support wheels are employed.

Obviously the positions of the support wheels and the guide tracks could be reversed, e. g., the wheels can be supported on the lower surface of rotatable tray 112 and the guide track located on the upper surface of lower stationary tray 114. The proper construction of this modification is obvious from an inspection of Figure 5.

The lower stationary tray 114 is provided with a plurality of discharge openings 136 arranged in 3 concentric circles in the same pattern as the feeder tubes but angularly displaced horizontally therefrom as discussed above.

The granular solids in moving bed 138 pass downwardly around bubble caps 116 and through feeder tubes 118. Upon rotation of rotatable tray 112, charge tubes 120 are successively filled with solids from feeder tubes 118 and then emptied through discharge openings 136.

Referring now more particularly to Figures 6, 7, and 8, transverse views of the geometrical arrangement of the feeder tubes, charge tubes, and discharge openings respectively in circular rows are shown. In Figure 6, upper stationary tray 110 in column 100 is shown provided with an innermost row of 3 feeder tubes spaced 120°, an adjacent row of 6 feeder tubes spaced 60°, and an outermost row of 12 feeder tubes spaced 30° apart. The dotted lines in Figure 6 indicate approximately and schematically the cross-sectional areas of column 100 which are drained by each feeder tube. The indicated areas are in the ratio of 1 to 4 to 16 for the inner, middle, and outer rows respectively.

In Figure 7 is a transverse view of geometrical arrangement of the charge tubes dependent from rotatable tray 112. Three rows of 8, 16, and 32 charge tubes respectively are provided. The circle diameters for the 3 rows are the same as those in Figure 6.

In Figure 8 is shown a transverse view of the lower stationary tray in which the discharge openings of the inner row are displaced 60°, the discharge openings in the middle row 30°, and the discharge openings in the outer row 15°, from the positions of the corresponding feeder tubes of the same row. In addition, a plurality of fluid flow apertures 140 are provided between the middle and outer rows of discharge openings.

Upon rotation of rotatable tray 112 the charge tubes pass in succession beneath the feeder tubes shown in Figure 6 and then above the discharge openings shown in Figure 8. The inner row of 8 charge tubes indicated in Figure 7 fill 3 times each per revolution from the inner row of feeder tubes shown in Figure 6, the middle row of 16 charge tubes fill 6 times each from the middle row of feeder tubes, and the outer row of 32 charge tubes fill 12 times each from the outer row of feeder tubes.

Example I

A solids feeder was constructed according to the design in Figures 1–4 and is operated in conjunction with a granular solids conveyor. The three feeder tubes are spaced 120° and the eight charge tubes are spaced 45° along 22 inch diameter circular rows. The tubes were fabricated from 4 inch schedule 40 steel pipe, the charge tubes being 11 inches long. The prime mover is an electric motor having a variable speed transmission which permits a variation of from 0 to 7 revolutions of the rotatable tray per minute. The maximum volumetric capacity is 1.95 cubic feet of solids per revolution or 13.6 cubic feet of solids per minute. The device is enclosed in a cylindrical housing 30 inches in diameter.

Example II

A commercial scale solids feeder according to the design shown in Figures 5–8 is contained in a column 11 feet 9.5 inches in diameter. Three concentric rows of 3 inch schedule 40 feeder tubes are employed having 3, 6, and 12 tubes per row, the tubes being 24 inches long. Three rows of 3 inch schedule 40 charge tubes 48 inches long are employed having 8, 16, and 32 tubes per row. The radii of these circular rows are 10.25, 20.5, and 48.5 inches respectively. The cross-sectional area drained by the central row of feeder tubes is 5.2 square feet, the middle row drains an annular area of 20.8 square feet, and the peripheral row drains an annular area of 83.2 square feet. The volumetric capacity of the feeder is 103.5 cubic feet per revolution and at 5 revolutions per minute, it discharges 517.5 cubic feet of solids per minute. A uniform downward motion of solids throughout the column cross section is obtained.

Example III

As an illustration of the weight capacity of these devices at the angular velocities of 7 and 5 R. P. M. given above, the device of Example I discharges 614 pounds per minute and the device of Example II discharges 23,500 pounds per minute of synthetic bead cracking catalyst having a bulk density of about 45 pounds per cubic foot.

The capacity of the devices of this invention may be increased by employing more circular rows of charge tubes, more charge tubes per row, charge tubes of greater diameter and/or length, and higher angular velocities. Since the peripheral charge tube row moves at the highest velocity, either the time required for the feeder tubes to fill the charge tubes in this row with solids at the gravity flow rate or the time required for these charge tubes to empty through the discharge openings will determine the maximum angular velocity of the rotatable tray. Operation at velocities over this maximum will result in increased solids delivery rates and an adverse effect upon the uniform downward movement of solids throughout the cross section of the vessel or column in which the device is operated.

It should be noted that while the spacing of the feeder tubes must be greater than the minimum value discussed above in order to prevent solids leakage through the device, no such minimum value exists as regards the charge tubes. The latter may be placed as close together in a given circular row as possible, even to the extent of fabricating each circular row of such charge tube conduits on the rotatable tray from a pair of spaced concentric cylinders of equal length and provided with a plurality of radial dividers therebetween to obtain a plurality of non-cylindrical charge tube conduits each having the cross section in the shape of a sector of an annulus.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

We claim:

1. An apparatus for metering the volumetric flow of granular solids through a system which comprises a chamber through which uniform solids flow is desired, an upper stationary tray peripherally supported from the inner walls of said chamber, a plurality of feeder conduits arranged with their inlets opening through and dependent from said upper stationary tray in a regular geometric pattern comprising a plurality of concentric circular rows of said feeder conduits, a lower stationary tray peripherally supported at the walls of said chamber in a position below and parallel to said upper stationary tray and provided with a plurality of discharge openings for solids flow therethrough distributed thereon in a regular geometric pattern comprising a plurality of concentric circular rows of said discharge openings, an intermediate rotatable tray supported between said upper and lower stationary trays and parallel thereto and having a diameter less than that of said chamber providing a free annular opening around the periphery of said rotatable tray, a plurality of charge conduits opening through and dependent from said rotatable tray and arranged thereon in a regular geometric pattern comprising a plurality of concentric circular rows of said charge conduits, each of the circular concentric rows of feeder conduits having a diameter relative to that of the other rows of said feeder conduits so as to drain an area through which solids flow downwardly above the upper stationary tray which is proportional to the number of times that the charge tubes in said row fill and empty per revolution of said intermediate rotatable tray, and motive means for rotating said rotatable tray to bring each charge conduit in a given circular row thereof successively first into alignment with a feeder conduit of the corresponding circular row thereof to receive a charge of solids therefrom and subsequently into alignment with a discharge opening in the corresponding circular row thereof to discharge said charge of solids therethrough.

2. An apparatus for metering the volumetric flow of granular solids through a system which comprises a chamber through which uniform solids flow is desired, an upper stationary tray peripherally supported from the inner walls of said chamber, a plurality of feeder conduits arranged with their inlets opening through and dependent from said upper stationary tray in a regular geometric pattern comprising at least one circular row of said feeder conduits, a plurality of fluid riser conduits surmounted with caps and spaced uniformly among the inlet openings of said feeder conduits thereon, a lower stationary tray peripherally supported at the inner walls of said chamber in a position below and parallel to said upper stationary tray and provided with a plurality of discharge openings for solids flow therethrough distributed thereon in a regular geometric pattern comprising at least one circular row of said discharge openings, an intermediate rotatable tray supported between said upper and lower stationary trays and parallel thereto, a plurality of charge conduits opening through and dependent from said rotatable tray and arranged thereon in a regular geometric pattern comprising at least one circular row of said charge conduits, the diameter of said rotatable tray being somewhat less than the diameter of said stationary trays leaving a free annular space for fluid flow around the periphery of said rotatable tray, and variable speed motive means for rotating said rotatable tray about a vertical axis at controllable angular velocities to bring each charge conduit successively first into alignment with a feeder conduit to receive a charge of solids therefrom and subsequently into alignment with a discharge opening to discharge said solids charge therethrough.

3. An apparatus according to claim 1 wherein the clearance between the outlet openings of said feeder conduits and said rotatable tray and the clearance between the outlet openings of said charge conduits and said lower stationary tray are greater than three times the average particle diameter of the solids being metered.

4. An apparatus according to claim 3 wherein said feeder conduits are spaced apart along the circular rows thereof at center-to-center distances which are at least equal to three times the inside dimension of the feeder conduit along said row plus seven times the clearance between the outlet opening of the feeder conduit and the rotatable tray.

5. An apparatus according to claim 4 wherein said discharge openings in a given circular row are angularly displaced from a position of axial alignment through a charge conduit with a corresponding feeder conduit by a distance along said circular row of discharge openings which is at least two times the inside dimension of said charge conduit plus three and one-half times the clearance between the outlet openings of said charge conduits and said lower stationary tray.

6. An apparatus according to claim 5 wherein the inside dimension of said feeder and charge conduits are at least seven times the average particle diameter of the solids being metered.

7. An apparatus for metering the volumetric flow of granular solids through a system which comprises a substantially vertical column through the entire cross-sectional area of which uniform downward solids flow is desired, an upper stationary tray supported in a horizontal plane within said column, a plurality of feeder tubes arranged with their inlets opening through and dependent from said upper stationary tray, said feeder tubes being arranged in a plurality of concentric circular rows around the center of said upper stationary tray, a lower stationary tray supported in a horizontal plane below said upper stationary tray and provided with a plurality of discharge openings for solids flow, said openings being arranged thereon in a plurality of concentric circular rows around the center of said lower stationary tray, an intermediate rotatable tray supporting between and having a smaller diameter than said upper and lower stationary trays, a plurality of charge tubes opening through and dependent from said rotatable tray and arranged thereon in a plurality of concentric circular rows around the center of said rotatable tray, the centers of said upper and lower stationary trays and said rotatable tray being aligned along a vertical axis, the diameter of a circular row of charge tubes being substantially the same as the diameter of corresponding rows of feeder tubes and discharge openings respectively, the diameter of each of said circular rows of charge tubes being fixed relative to the diameter of the other rows and to the inside diameter of said column so as to drain through said row an area of said column which is proportional to the number of times that the charge tubes in that row fill and empty per revolution of said rotatable tray, and motive means for rotating said rotatable tray in a horizontal plane to bring each charge tube in a given circular row thereof successively first into alignment with a feeder tube in the corresponding circular row thereof to receive a charge of solids therefrom and subsequently into alignment with a discharge opening in the corresponding circular row thereof on said lower stationary tray to discharge said charge of solids therethrough to secure substantially uniform downward solids velocity throughout the transverse area of said column.

8. An apparatus for metering the volumetric flow of granular solids through a system which comprises a substantially vertical column through which uniform solids flow is desired, an upper stationary tray substantially filling the cross section of said column and supported horizontally therein, a plurality of feeder tubes arranged with their inlets opening through and dependent from said upper stationary tray, a lower stationary tray substantially filling the cross section of said column and supported horizontally therein and provided with a plurality of discharge openings for solids flow, an intermediate rotatable tray supported between said upper and lower stationary trays and having a diameter less than said stationary trays leaving a free fluid flow path around the periphery thereof, a plurality of charge tubes opening through and dependent from said rotatable tray, motive means for rotating said rotatable tray in a horizontal plane, means for varying the angular velocity of said rotatable tray whereby the solids flow rate is varied, said feeder tubes and charge tubes and discharge openings having diameters which are at least 10 times the average particle diameter of the solids being metered, said feeder tubes and charge tubes and discharge openings being arranged on said upper stationary tray and said rotatable tray and said lower stationary tray, respectively, in a plurality of circular rows around the center of said trays, the clearance between the feeder tube outlets and said rotatable tray and the clearance between the charge tube outlets and said lower stationary tray being at least three times the average particle diameter of the solids being metered, said feeder tubes being spaced apart center-to-center along each circular row thereof a distance at least equal to three times the feeder tube inside diameter plus seven times the clearance between their outlets and said rotatable tray, said discharge openings being spaced apart center-to-center along each circular row thereof a distance at least equal to three times the discharge opening diameter plus seven times the clearance between the charge tube outlets and said lower stationary tray, said discharge openings being angularly displaced along the circular rows thereof a distance at least equal to twice the discharge opening diameter plus three and one-half times the clearance between the charge tube outlets and said lower stationary tray, said distance being measured from a point on the circular row of discharge openings vertically below the center of a feeder tube in the corresponding row thereof on said upper stationary tray, such angular displacement preventing leakage of solids through said apparatus, the diameter of each of said circular concentric rows of charge tubes being fixed relative to the diameters of the other rows and of said vertical column so that each of said rows of feeder tubes drains an area of said vertical column which is proportional to the number of said feeder tubes multiplied by the number of charge tubes in that row, the rotation of said rotatable tray successively bringing each charge tube first into alignment with a feeder tube to receive a charge of solids therefrom while the lower opening of said charge tube is sealed against the surface of said lower stationary tray and second into alignment with a discharge opening to discharge said solids therethrough while the upper opening of said charge tube is misaligned with any of said feeder tubes and subsequently into alignment with the adjacent feeder tube in the circular row thereof to obtain a controlled volumetric discharge of solids from said vessel and a uniform downward solids movement throughout the entire cross-sectional area thereof.

9. An apparatus according to claim 8 in combination with a plurality of fluid riser conduits surmounted by caps and arranged uniformly among the upper openings of said feeder tubes on said upper stationary tray to provide a low resistance fluid flow path therethrough, said rotatable tray being smaller in diameter than said column to provide an annular fluid flow path around the periphery of said tray, said riser conduits and caps and said annular path preventing interference by fluid flow with the solids flow through said apparatus.

10. An apparatus according to claim 9 wherein said lower stationary tray is provided with additional openings for fluid flow therethrough, said additional openings being arranged between said circular rows of discharge openings so that no solids pass through said additional openings from said charge tubes.

11. An apparatus for metering the volumetric flow of granular solids through a system in which uniform downward solids flow is desired which comprises a vessel through which the solids pass downwardly as a moving bed, an inlet conduit for solids opening into the upper portion of said vessel, an outlet conduit for solids opening from the lower portion of said vessel, an upper stationary tray disposed transversely within said vessel and supported from the walls thereof, a plurality of feeder conduits extended downwardly from said upper stationary tray and having their outlet openings arranged in a uniform geometric pattern comprising a plurality of concentric circular rows thereof, a lower stationary tray disposed transversely in said vessel below said upper stationary tray and supported from the walls thereof and provided with a plurality of discharge openings for solids flow distributed thereon in a regular geometric pattern comprising a plurality of concentric circular rows thereof, a rotatable tray supported between said stationary trays and having a diameter less than those of said stationary trays leaving a peripheral fluid flow path around said rotatable tray, a plurality of charge conduits opening through and dependent from said rotatable tray and arranged in a regular geometric pattern comprising a plurality of concentric circular rows thereof, the diameter of each of said circular rows being fixed relative to the diameter of the other circular rows so as to drain solids through said row from an area proportional to the number of feeder conduits multiplied by the number of said charge conduits in said row, and motive means for rotating said rotatable tray continuously relative to said stationary tray to bring each charge conduit in a given circular row thereof successively first into alignment with a feeder conduit of the corresponding row thereof to receive a charge of solids therefrom and subsequently into alignment with a discharge opening in the corresponding circular row thereof to discharge said solids therethrough whereby a substantially uniform downwardly velocity of solids flow throughout the entire transverse cross sectional area of said vessel is obtained.

References Cited in the file of this patent

UNITED STATES PATENTS

| | | |
|---|---|---|
| 1,145,215 | Roney | July 6, 1915 |
| 1,174,371 | Wegner | Mar. 7, 1916 |
| 2,037,555 | Zwoyer | Apr. 14, 1936 |
| 2,544,214 | Berg | Mar. 6, 1951 |
| 2,553,561 | Evans | May 22, 1951 |
| 2,610,646 | Michaelson | Sept. 16, 1952 |
| 2,635,706 | Gilmore | Apr. 21, 1953 |
| 2,647,587 | Berg | Aug. 4, 1953 |